May 5, 1936. E. C. FICHTNER 2,039,641
IMMERSION HEATER
Filed Aug. 15, 1931 5 Sheets-Sheet 3
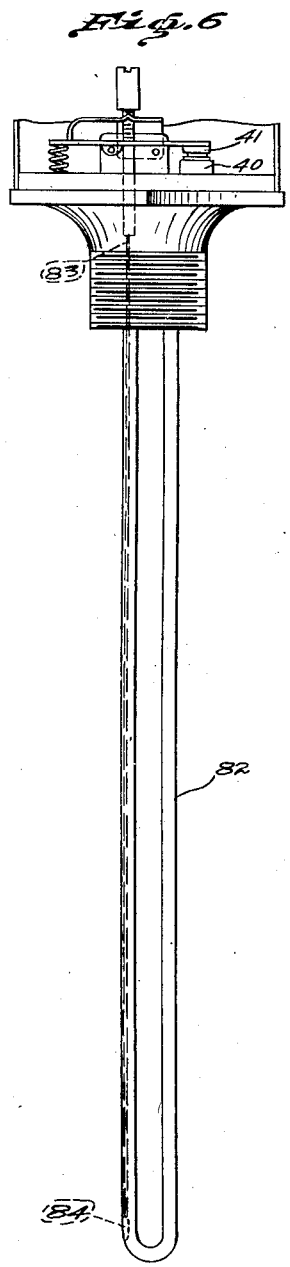
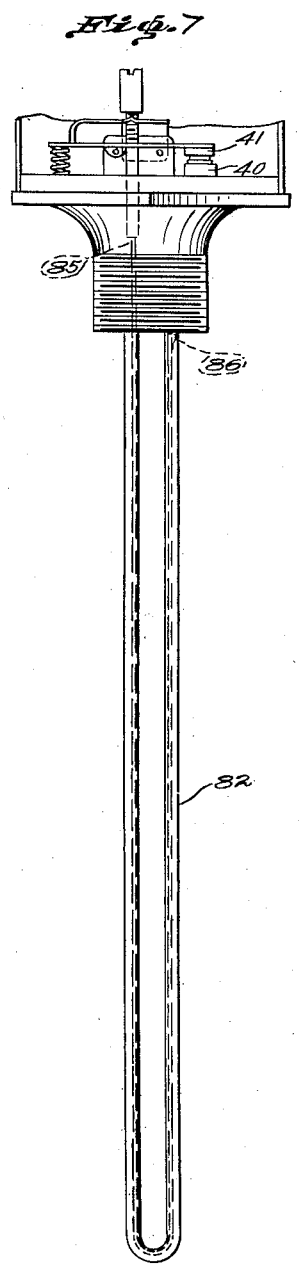
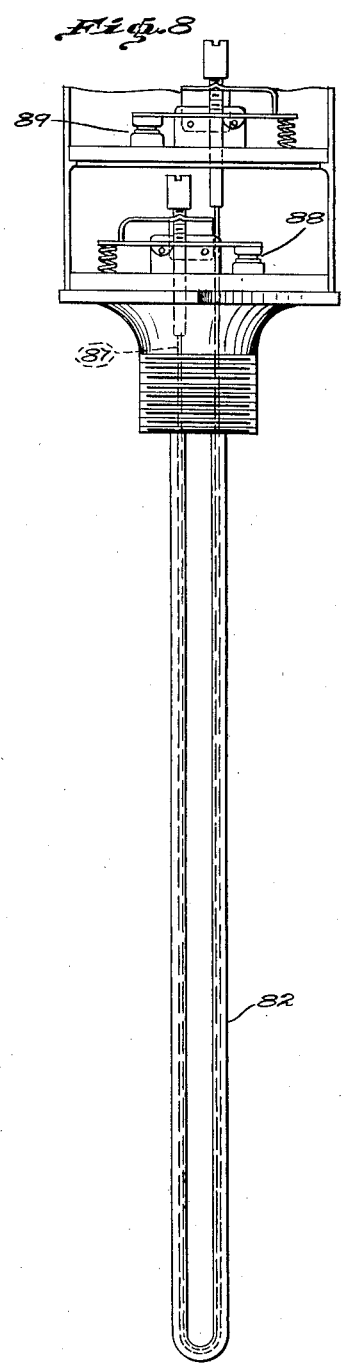
Inventor
Edwin C. Fichtner
by John Flam
Attorney

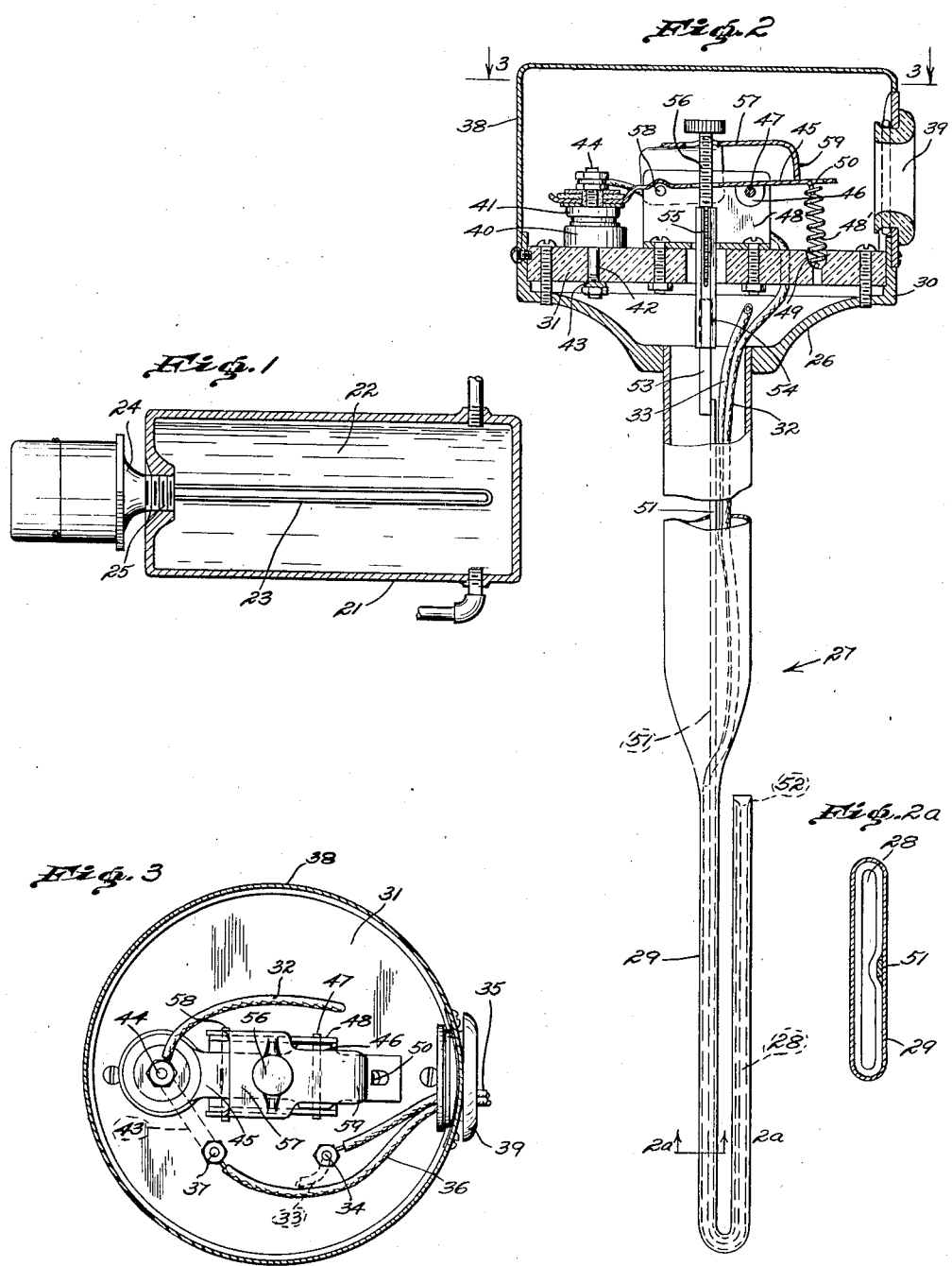

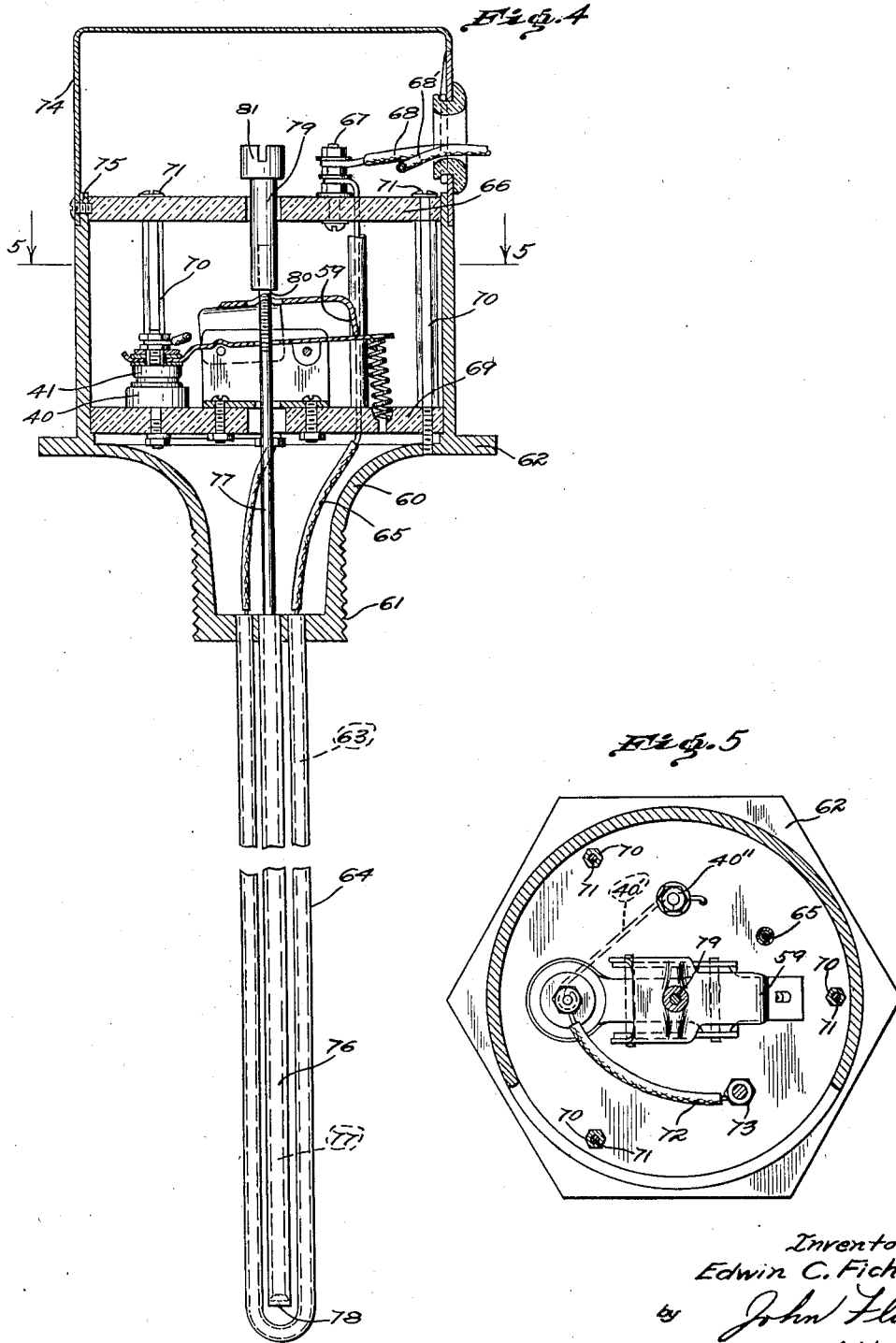

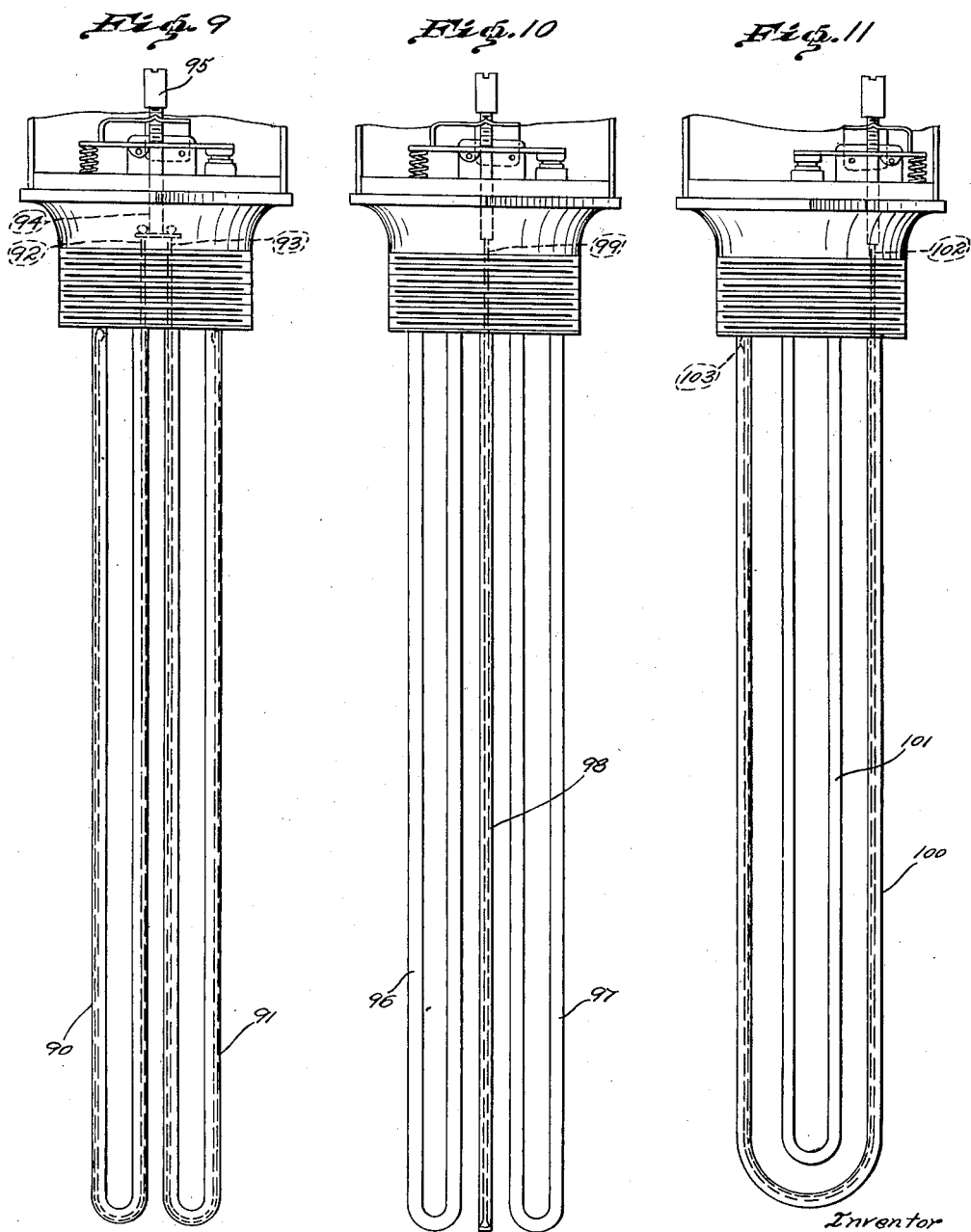

May 5, 1936.  E. C. FICHTNER  2,039,641
IMMERSION HEATER
Filed Aug. 15, 1931   5 Sheets-Sheet 5
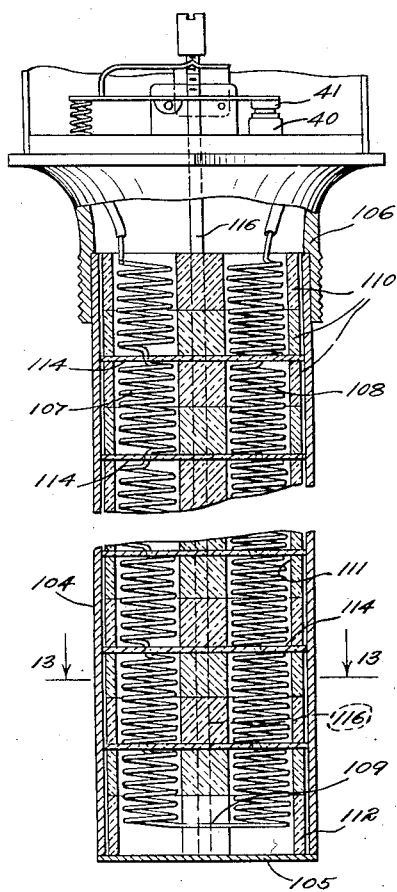
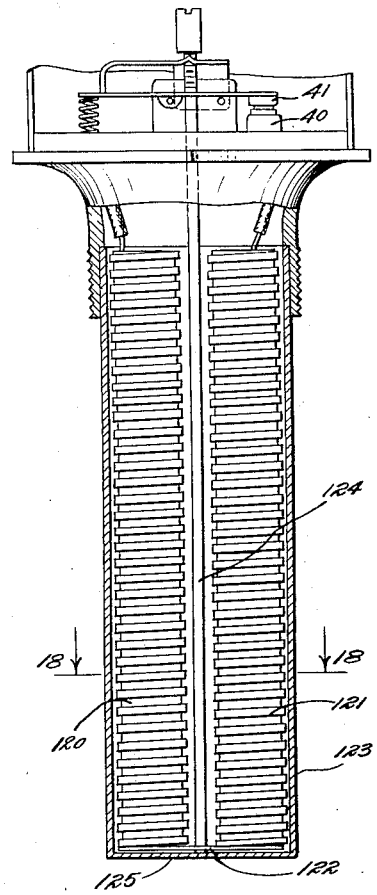
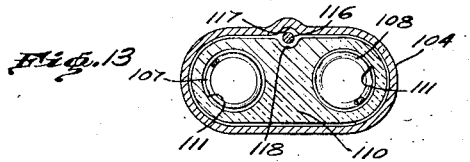
Inventor
Edwin C. Fichtner
by John Flam
Attorney Patented May 5, 1936

2,039,641

UNITED STATES PATENT OFFICE 2,039,641

IMMERSION HEATER

Edwin C. Fichtner, San Francisco, Calif.

Application August 15, 1931, Serial No. 557,199

7 Claims. (Cl. 219—41)

This invention relates to an immersion heater, and more particularly a liquid heater that is operated by an electrical heating element.

Immersion heaters of this general character are well known. They usually include a heating element confined in a metal casing and in good heat exchanging contact with the element. The sheath or casing can be immersed in the liquid to be heated.

In such devices, it has been suggested to control the temperature attained in the liquid as by thermostatic devices that control the circuit of the heater. It is one of the objects of my invention to provide a compact and inexpensive immersion heater that incorporates the thermostatic control; and preferably in such a way that the heater can also be used as a cap for tightly closing the tank or receptacle in which it is used.

I accomplish this result by mounting the control elements on the head or cap, said elements being compact, simple, and readily adjustable over a considerable range of temperature variation.

It is possible at times for the liquid in which the heater is immersed to be evaporated or to have its level otherwise lowered, whereby at least a part of the sheath is out of contact with the liquid. Under such circumstances, the transfer of heat from the element is much slower, and the element will burn out if left energized. It is accordingly another object of my invention to arrange the thermostatic control in such a way that it is responsive to the heat reached at or neighboring the heating element, whereby it responds not merely to the temperature of the surrounding medium, but also to the temperature of the element itself.

It is another object of my invention to improve the construction of immersion heaters in general.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a sectional view showing how my heater can be used in a closed horizontal receptacle;

Fig. 2 is an elevation, partly in section, of a heater embodying my invention, some of the parts being shortened to reduce the size of the figure;

Fig. 2a is an enlarged detail section, taken along plane 2a—2a of Fig. 2;

Fig. 3 is a sectional view, taken along plane 3—3 of Fig. 2;

Fig. 4 is a view similar to Fig. 2, of a modified form of the heater;

Fig. 5 is a sectional view, taken along plane 5—5 of Fig. 4;

Figs. 6, 7, 8, 9, 10, 11 and 12 are views similar to Fig. 2, illustrating still further modifications;

Fig. 13 is a sectional view, taken along plane 13—13 of Fig. 12;

Fig. 14 is a view similar to Fig. 13 of a slightly modified form;

Fig. 15 is a perspective view of one of the parts used in the heater shown in Fig. 12;

Fig. 16 is a detail view of another part used in the heater shown in Fig. 12;

Fig. 17 is a view similar to Fig. 2 of still another modification; and

Fig. 18 is a detail section, taken along plane 18—18 of Fig. 17.

In Fig. 1 there is shown a tank or receptacle 21 having a body of liquid 22 therein. An immersion heater 23 is indicated in a horizontal position, carried on a threaded cap 24 that closes the vessel 21. In this instance the heater unit 23 is shown in a horizontal position. This heater unit can be of any one of a number of forms hereinafter described. In these forms, the cap 24 can be threaded or not; if a tight seal is desired, threads such as 25 can be provided to act as a plug for the receptacle.

In the form shown in Figs. 2 and 3, the cap 26 is unthreaded. This cap is thus adapted to fit loosely over an opening into a receptacle. The sheath 27 for the heating element 28 extends from cap 26, and is tightly joined into an aperture therein, as by welding or silver soldering. The upper part of the sheath 27 can be round, the lower part being flattened as indicated at 29, to encompass tightly the flat heating element 28. This element of course is appropriately insulated against electrical grounding on sheath 27, but is in good heat exchanging relationship thereto.

The cap 26 has a flange or rim 30 on a shoulder of which is supported a base 31 of insulation material. This base forms a convenient support for the control contacts as will be hereinafter explained. Leads for the element 28 are accommodated in the tubular part 27, and extend into cap 26. One lead 32 is conducted through an aperture in the base 31; and the other lead 33 connects to the bottom of a post 34 (Fig. 3), that extends through base 31. The external connection 35 is led to the top of this post. The other external connection 36 fastens to another post 37 that extends through base 31. The complete circuit for the element 28 includes a switch which will be later described. A cover 38 is accommodated on flange 30 and includes a bushing 39 through which connections or leads 35, 36 extend to any suitable source.

In the present instance, I show the lower end 29 of the sheath 27 as bent up so as to form a U whereby the heating effect is concentrated more definitely at the free end of the sheath; but of course a straight form could also be used.

The control of the circuit for element 28 is effected in this instance by the aid of a pair of relatively movable contacts 40, 41. The stationary contact 40 is supported directly on base 31 as by a bolt 42, joined to the bottom of the contact, and is connected to incoming lead 36 as by a bar 43 on the bottom of the base 31. This bar extends to the lower end of post 37, to which lead 36 connects. The upper or movable contact 41 has an integral post 44 that is insulated from and carried by a lever 45. This lever has a pair of ears 46 through which a pivot pin 47 extends. This pin is supported in a bracket 48 having a pair of legs that embrace the ears 46. This bracket is fastened to base 31.

The lever 45 is urged to closing position, as by a compression spring 48'. This spring is seated below an extension of lever 45, in a hollow 49 of base 31; and its upper end is guided by a stamped out projection 50 of lever 45.

The circuit for heating element 28 can now be traced through these contacts. One lead such as 35, connects to post 34, thence to lead 33, which connects to the lower end of post 34, element 28, lead 32, post 44, contacts 41, 40, bar 43, post 37, to lead 36. It is thus apparent that if lever 45 is tilted in a clockwise direction, spring 48 is compressed; the contacts 40, 41 open, and the element 28 is deenergized.

This tilting of lever 45 is rendered automatic in response to the attainment of excessive or undesired temperatures. Preferably the temperatures immmediately adjacent the heating element 28 are the controlling factors. For this purpose, the expansion of sheath 27 when its temperature rises is made use of to affect the contacts 40, 41 directly. This sheath is accordingly made from material such as brass which has a considerable expansion with temperature rise; that is, it has a large coefficient of expansion.

As sheath 27 expands, it serves to actuate a rod or ribbon 51 (Figs. 2 and 2a) pulling it downward with respect to cap 26 as the temperature increases. This element 51 is attached to the end of sheath 27, as by silver solder at the point 52 and is totally enclosed by the sheath. Furthermore it is made from some material that has a low coefficient of expansion, such as invar. Since it is attached to the sheath 27 at a point considerably remote from cap 26, it is apparent that as sheath 27 expands, the element 51 will be pulled down by the end of the sheath at 52.

This downward movement of element 51 is translated into a clockwise movement of lever 45, when the expansion reaches a definite predetermined value. To effect this, element 51 carries a rod 53 to which is fastened a long split nut 54. This nut extends through base 31. The split 55 in the nut 54 is provided for securing tight frictional contact with the threads of an adjustable screw 56 which extends through an aperture in lever 45. The lower surface of the head of screw 56 is arranged to coact with the supplemental lever 57. This lever is pivoted at 58 in bracket 48 and has a spur or projection 59 engaging the extension of lever 45. When member 51 moves down sufficiently, due to expansion of sheath 27, the head of screw 56 engages lever 57 and this lever operates lever 45 to open the contacts 40, 41. The degree of heat needed to effect this can be controlled by adjusting the position of screw 56 in nut 55.

The inexpansible element 51 and sheath 27 form a thermostatic mechanism that responds very quickly to variations in temperature adjacent the element 28. This is due to the close contact of sheath 27 and the heating element. Therefore, if for any reason the sheath reaches a temperature that is abnormal, the contacts 40, 41 open, and stay open until the sheath cools to a predetermined temperature. For example, if the transfer of heat from element 28 is reduced (such as may be occasioned by the liquid level receding from the heater), the temperature of the element 28 may reach such a high value as to injure it permanently or to destroy it, where it not for the quick response obtained by the arrangement described.

In Figs. 4 and 5 another embodiment of the invention is shown. In this form, cap 60 has a screw threaded portion 61 to provide a tight fitting covering for a vessel. A hexagonal flange 62 can be provided for convenience in installing the heater.

In this instance, the heating element 63 is enclosed tightly in a U shaped sheath 64. The upper ends of the legs of the sheath 64 are secured in fluid tight manner into the lower portion of cap 60. One lead 65 of element 63 passes through an insulation cover 66 and is connected to a binding post 67 to which the external lead 68 connects. The other lead 68' of the source connects to the top contact 41, as by connection 72 and post 73. The lower contact 40 is connected to the other lead of the element, as by connection 40' and post 40" on base 69. The cover 66 is held in spaced relation over the base 69 by spacers 70 through which screws 71 extend. A metal cover 74, is held to flange 75 of cap 60.

The operating mechanism for contacts 40, 41 is similar to that already described in connection with Figs. 2 and 3. However, in this instance the sheath 64 does not form a part of the thermostat. Instead, a long brass tube 76 is used, fastened in a fluid tight manner to cap 60, and in close proximity to sheath 64, as by being located between the legs of the U formed by the sheath. An invar bar 77 extends into the tube 76 and is fastened to the tube at the bottom 78 thereof. This bar accordingly is pulled down when the tube 76 expands. A nut 79 threaded on bar 77 has a bottom surface 80 that coacts with lever 59. This nut engages the threads of bar 77 with considerable frictional force, so as to stay in any position it may be adjusted to, by the aid of a head 81.

In this case, the speed of response of the thermostat depends upon how quickly the tube 76 responds to temperature variations. Since this tube is very closely spaced to the sheath 64, the response is rapid, and especially so when the heater is not immersed in a liquid. When not immersed, there is much slower heat transfer from the element 63 and attendant rapid temperature rise.

In Fig. 6 there is illustrated a modified form in which the sheath 82 is similar to sheath 64 of Fig. 4; but the invar element 83 extends into one of the legs of the U and is silver soldered as at 84 near the bottom of the U. The sheath 82 thus surrounds the element 83. Thus this element 83 is pulled downwardly upon expansion of the left hand leg of sheath 82, and opens contacts 41, 40.

In Fig. 7, the heating element is also similar to that shown in Fig. 4. In this case, however, the invar element 85 extends through both legs of the sheath 82, and is silver soldered at the top of one of the legs, as at 86, but is freely movable with respect to the sheath at all other places. Thus in this case, the element 85 responds to an expansion of either or both legs of the sheath 82, as it is in good thermal conducting relation to each leg and is enclosed by the sheath.

Instead of anchoring one end of the element 85 to the sheath, it might be made use of to operate a supplemental contact, thus forming a double pole switching arrangement. This modification is shown in Fig. 8. In this figure, the invar element 87 extends through both legs of the U formed by the sheath 82. The left hand portion of element 87 operates contacts 88; and the right hand portion operates contacts 89. In this case, as in Fig. 7, any failure to transfer heat at a sufficiently rapid rate from any portion of the sheath will cause rapid operation of the contacts. This may arise due to a partial submersion of the sheath in the liquid to be heated. Such a partial submersion may occur when the heater is in the horizontal position of Fig. 1, and the liquid 22 recedes so far as to uncover the upper leg of the sheath.

The arrangements described can be adapted for other forms of the sheath. For example, in Fig. 9 there are two U shaped sheaths 90, 91 each housing a heater unit. These units may be operated in series or parallel. Invar elements 92, 93 can extend respectively through both sheaths. One end of each element 92, 93 can be fastened, as by silver solder, to the upper end of a leg of the respective sheath. The free ends can be joined to a common post 94 that carries the adjusting nut 95. In this form, as in the form of Fig. 7, the contacts are operated whenever excessive heating occurs at any part of the sheaths 90 and 91.

In the modification shown in Fig. 10, there are again two U-shaped elements 96, 97. The thermostatic control however is effected by the expansion of a tube 98 extending between the elements 96, 97, and housing the invar member 99. The operation of this form is similar to that of Fig. 4.

In Fig. 11, there are shown two U-shaped elements 100, 101, but in nested relationship. The element 100 extends around element 101. In the sheath of element 100 is located the invar member 102, joined at 103 to the sheath. In this form, the controlling function occurs in response to undue temperature rise anywhere along the sheath of element 100. Since this element extends around element 101, it is apparent that if the liquid to be heated recedes below the upper leg of element 100 (disposed as in Fig. 1), the control is effective to safeguard both elements.

The particular manner of enclosing the invar element in a sheath of an immersion heater can be varied in accordance with the particular structure of the heater unit itself. This is well illustrated in the form of the heater shown in Figs. 12 to 16 inclusive.

In this form, the sheath 104 is tubular and has a fluid tight bottom 105. It is also welded or appropriately soldered in fluid tight manner in the cap 106. The heater element is shown as made up of a pair of helices 107, 108, connected in series as by the wire 109. In order to insulate these coils from the sheath 104, and support them properly, insulation beads 110 are used, preferably made from such material as porcelain or bakelite. Each of these beads has a pair of large apertures 111 (Fig. 13) for the accommodation of the coils 107, 108. The bottom bead 112 (Fig. 15) has a slot 113 connecting the apertures 111 to accommodate the wire 109 and to keep it enclosed in insulation.

In order to prevent sagging of the turns of the helices 107, 108, when they are heated, there may be used a number of spacers 114 (Fig. 16) of insulation. Each of these spacers has a pair of grooves 115 enabling the spacer to be slipped between adjacent beads 110. These spacers support the turns by being tightly held in sheath 104.

The thermostatic control is effected in response to expansion and contraction of the sheath 104. For this purpose, invar bar 116 is fastened to the bottom plate 105 of sheath 104. It extends vertically inside the sheath 104, being accommodated in longitudinal concavities 117, 118 formed respectively in the sheath 104 and in beads 110. Alternatively, the bar 116 may extend, as shown in Fig. 14, through the center of the beads 118, which are in this case shown as provided with a central aperture 119 for this purpose. The bar 116 of course can operate the contacts 40, 41 as in the previous forms, it being fastened to the bottom 105 of the sheath 104.

The sheath encompassing the heating elements can take still other forms. For example, in Figs. 17 and 18, the heating element is made up of a pair of flat wound members 120, 121, placed so that their edges are adjacent. These members 120, 121 are connected in series as by the wire 122. A sheath 123 tightly encompasses the members 120, 121. An invar bar 124 is fastened as by silver solder to the bottom plate 125 of the sheath 123, and is pulled down as the sheath expands, for operating contacts 40, 41. The bar 124 is thus entirely enclosed in the sheath 123. It is in close proximity to both members 120, 121, as it is accommodated between the adjacent edges of these members, in a space provided by a longitudinal rib 126 formed on the sheath 123.

I claim:

1. In an immersion heater, a sheathed heating element, the sheath thereof being in intimate heat exchanging relation to the element, said element having a pair of legs forming an elongated U, and a member of low coefficient of expansion enclosed by the sheath and also forming a U, for controlling the element.

2. In an immersion heater, a sheathed heating element, the sheath thereof being in intimate heat exchanging relation to the element, said element having a pair of legs forming an elongated U, and a member of low coefficient of expansion enclosed by the sheath for controll the element, said member being joined to sheath at a point remote from one of the of the U.

3. In an immersion heater, a sheathed heating element, the sheath thereof being in intimate heat exchanging relation to the element, said element having a pair of legs forming an elongated U, a member of low coefficient of expansion enclosed by the sheath for controlling the element, said member extending through both legs of the U, and contacts operated by each end of the member for controlling the element.

4. In an immersion heater, one or more heater element helices, beads of insulation material enclosing the turns of the helices, a sheath surrounding the elements and beads in fluid tight relation, and a member of low coefficient of expansion enclosed in the sheath and joined to it at a point, for controlling the element.

5. The combination as set forth in claim 4, with the addition of intermediate spacers to maintain a predetermined spacing of turns and for supporting the helices with respect to the sheath.

6. The combination as set forth in claim 4, in which the member is fastened to the end of the sheath and extends through it in a hollow provided between the beads and the sheath.

7. In an immersion heater, a pair of flat heating units having their narrow edges in close spaced relation, a sheath enclosing both units in fluid tight manner, and a member of low coefficient of expansion fastened at one point to the sheath and extending longitudinally of the units and in close spaced relation to their adjacent edges, for controlling the units.

EDWIN C. FICHTNER.